United States Patent
Sharkey et al.

(10) Patent No.: US 8,793,721 B1
(45) Date of Patent: Jul. 29, 2014

(54) SYSTEM AND METHOD FOR PROVIDING MULTIPLE RATING VERSIONS IN MEDIA PROGRAMMING

(75) Inventors: Jeffrey L. Sharkey, Hermosa Beach, CA (US); Coleen N. Tajiri, Manhattan Beach, CA (US); Luke J. Crook, Torrance, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/403,716

(22) Filed: Feb. 23, 2012

(51) Int. Cl.
  *H04N 7/16* (2011.01)
  *H04N 21/4402* (2011.01)
  *H04N 21/432* (2011.01)
  *H04N 21/433* (2011.01)
  *H04N 21/44* (2011.01)
  *H04N 21/45* (2011.01)
  *H04N 21/454* (2011.01)
  *H04N 21/458* (2011.01)
  *H04N 21/854* (2011.01)

(52) U.S. Cl.
  CPC ....... *H04N 21/44029* (2013.01); *H04N 21/432* (2013.01); *H04N 21/433* (2013.01); *H04N 21/44016* (2013.01); *H04N 21/4402* (2013.01); *H04N 21/4532* (2013.01); *H04N 21/454* (2013.01); *H04N 21/4542* (2013.01); *H04N 21/458* (2013.01); *H04N 21/854* (2013.01)
  USPC .......... 725/28; 725/25; 725/26; 725/27; 725/29; 725/30; 725/31

(58) Field of Classification Search
  CPC ............. H04N 21/432; H04N 21/433; H04N 21/44016; H04N 21/4402; H04N 21/44029; H04N 21/454; H04N 21/4532; H04N 21/4542; H04N 21/458; H04N 21/854
  USPC ....................................... 725/25–31
  See application file for complete search history.

(56) References Cited

U.S. PATENT DOCUMENTS

| | | | |
|---|---|---|---|
| 6,181,364 B1 * | 1/2001 | Ford | 725/32 |
| 7,080,392 B1 * | 7/2006 | Geshwind | 725/34 |
| 7,380,258 B2 * | 5/2008 | Durden et al. | 725/25 |
| 2002/0120931 A1 * | 8/2002 | Huber et al. | 725/34 |
| 2003/0229899 A1 * | 12/2003 | Thompson et al. | 725/87 |
| 2005/0066354 A1 * | 3/2005 | Dellow et al. | 725/30 |
| 2006/0218617 A1 * | 9/2006 | Bradstreet et al. | 725/135 |
| 2007/0220583 A1 * | 9/2007 | Bailey et al. | 725/135 |
| 2009/0178085 A1 * | 7/2009 | Narahara et al. | 725/62 |
| 2010/0232758 A1 * | 9/2010 | Cook et al. | 725/28 |

* cited by examiner

*Primary Examiner* — Jeremy Duffield

(57) ABSTRACT

Multiple rating versions of content are provided and selectable by a viewer. A user can select one of the rating versions of the content for viewing. The user selection is dynamic such that the user can change the rating version selected while watching the content. Substitution instructions and substitution segments are downloaded and stored in a substitution cache. When a substitution descriptor is encountered in the content, a processor obtains at least one substitution instruction that corresponds to a substitution instruction identification code stored in the substitution descriptor. The processor executes the instruction to effect the rating change.

17 Claims, 8 Drawing Sheets

/—602

| Time | Instruction | Segment Identification |
|---|---|---|
| 00:15:30 | Substitute video and audio content | Seg 1 |
| 01:20:00 | Substitute audio content | Seg 4 |
| 01:30:00 | Mute audio content | |

SYSTEM AND METHOD FOR PROVIDING MULTIPLE RATING VERSIONS IN MEDIA PROGRAMMING

BACKGROUND

1. Field

Embodiments relate to presenting media content programming to a user. More particularly, embodiments relate to providing media content programming to a user so that the user can select a rating version at which to experience the media content programming.

2. Background

Media content, or content, such as video systems, audio systems, and combinations thereof, including multimedia systems provide a rich varied choice of programming to their users. However, not all of the media content is suitable for all those desiring to experience the media content. As such rating systems have been developed to alert users to what to what is contained in the media content to alert users so that they can determine whether the media content is suitable for a particular user.

For example, current television programming can be offered with a variety of rating classifications. For example, in the United States, television programming is offered with the following ratings: TV-Y (for all children), TV-Y7 (directed to children 7 and older), TV-Y7-FV (directed to children 7 and older with fantasy violence), TV-G (general audience), TV-PG (parental guidance suggested), TV-14 (parents strongly cautioned/may be unsuitable for children under 14), and TV-MA (mature audiences/unsuitable for audiences under 17). Each of these classifications can be further subdivided in certain cases. For example, TV-14 can be further subdivided by adding the letter "D" (intensely suggestive dialogue), "L" (strong coarse language), "S" (intense sexual situations), and "V" (intense violence).

Much television programming, including movies and episodic series have ratings that will result in much of the population not being permitted to view the programming. For example, parents often do not allow their children to view television programming having a rating of TV-MA.

Typically, only a small portion of the playing time of the television programming in most mainstream movies and episodic series (or any content) is responsible for a more restrictive rating. For example, in a particular program it may be the case that even a single scene causes the program to have the more restrictive rating. For example, a one hour program may be rated TV-14 for only a few minutes, or in cases, even a few seconds of the programming. It is this small segment that may be responsible for the rating of TV-14 rather than ITV-PG.

As a result, while a majority of a television program may be suitable for children, they are likely not to be permitted to view the program due to its more restrictive rating. Thus, children may not be permitted to view programs that would otherwise not only be entertaining to them, but also educational. This is quite problematic because the television programming is generally shown at one rating and not available in any other rating version until many years later, if at all.

One approach to solving this ratings issue is to have multiple channels dedicated to various ratings. For example, premium movie channels such as HBO could have an HBO TV-G-rated channel, and HBO TV-14-rated channel, etc. This solution would prove infeasible due to the large number of additional channels and consequent channel capacity that would be required.

Another possible approach is to present a TV-G-rated version of a program at 7 pm, a TV-4-rated version at 8 pm, a TV-MA rated version at 9 pm, etc. However, this approach would not work as channel programming for a particular channel would be greatly reduced due to the number of repeated programs albeit with different rating versions. These concepts for television programming ratings classifications apply equally well to other forms of rated media content, for example, movie ratings by the Motion Picture Association of America (MPAA), and recoding ratings by the Recording Industry Association of America (RIAA), as well as international ratings organizations.

SUMMARY

Multiple rating versions of content are provided and selectable by a viewer. A user can select one of the rating versions of the content for viewing. The user selection is dynamic such that the user can change the rating version selected while watching the content. Substitution instructions and substitution segments are downloaded and stored in a substitution cache. When a substitution descriptor is encountered in the content, a processor obtains at least one substitution instruction that corresponds to a substitution instruction identification code stored in the substitution descriptor. The processor executes the instruction to effect the rating change.

In an embodiment, a system allows a user to select one of a plurality of rating versions in which to experience content. In an embodiment, the system comprises a memory, the memory having a substitution cache to store one or more substitution segments and one or more substitution instructions; a substitution descriptor detector to detect a substitution descriptor in the content being delivered to the user; and a processor to process the substitution descriptor to obtain an identification for at least one substitution instruction from the substitution descriptor, wherein the processor obtains and executes at least one substitution instruction from the substitution cache corresponding to the obtained identification to cause a rating version change in the content being delivered to the user.

In another embodiment, a system allows a user to select one of a plurality of rating version in which to experience content. In an embodiment, the system comprises a memory, the memory having a substitution cache to store one or more substitution segments and one or more substitution instructions; a substitution instruction schedule that stores a time for a substitution instruction to be executed, a substitution identification code corresponding to a substitution instruction to be executed at the time; and a processor configured to monitor elapsed time, to determine if the elapsed time coincides with a time in an entry in the substitution instruction schedule, and when there is such time elapsed time coincidence, to obtain and execute at least one substitution instruction from the substitution cache corresponding to the instruction in the substitution instruction schedule corresponding to the elapsed time to cause a rating version change in the content being delivered to the user.

In another embodiment, a method for allowing a user to select one of a plurality of rating version in which to experience content comprises receiving at least one substitution instruction and storing the received at least one substitution instruction in a memory cache: receiving at least one substitution segment and storing the received at least one substitution segment in a memory cache; storing a rating version selected by a user memory location; and executing at least one substitution instruction to change the content being delivered to the user in accordance with the rating version stored in the memory location.

Additional features and embodiments of the present invention will be evident in view of the following detailed description of the invention.

DETAILED DESCRIPTION

Figure 1:
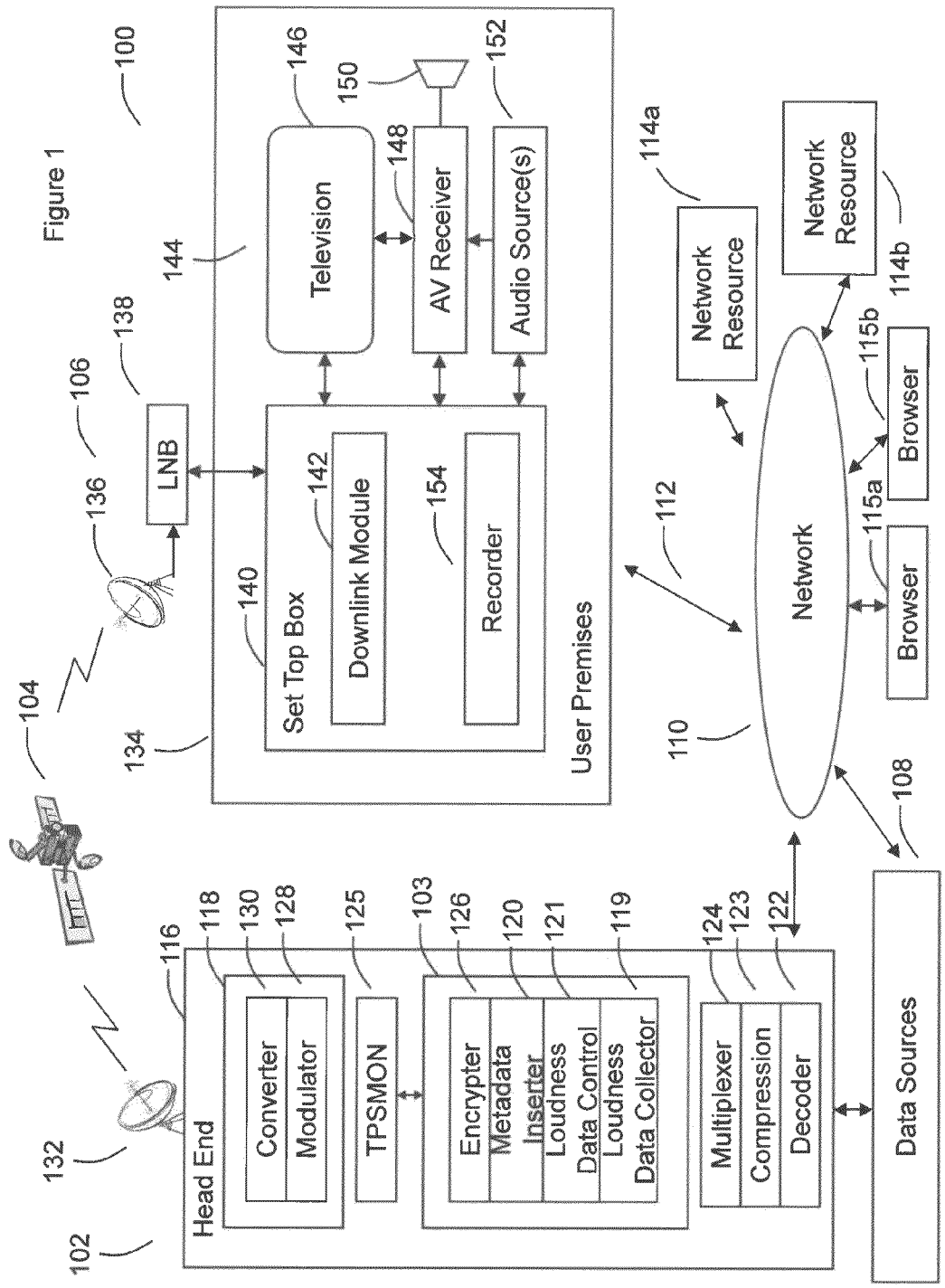
FIG. 1 is a schematic diagram of an exemplary system for providing television services in a television broadcast system, such as a television satellite service provider, according to an embodiment.

FIG. 1 is a schematic diagram of an exemplary system 100 for providing television services in a television broadcast system, such as a television satellite service provider, according to an embodiment. As shown in FIG. 1, exemplary system 100 is an example direct-to-home (DTH) transmission and reception system 100. The example DTH system 100 of FIG. 1 generally includes a transmission station 102, a satellite/relay 104, and a plurality of receiver stations, one of which is shown at reference numeral 106, between which wireless communications are exchanged at any suitable frequency (e.g., Ku-band, Ka-band, and reverse band frequencies). As described in detail below with respect to each portion of the system 100, information from one or more of a plurality of data sources 108 is transmitted from transmission station 102 to satellite/relay 104. Satellite/relay 104 may be at least one geosynchronous or geo-stationary satellite. In turn, satellite/relay 104 rebroadcasts the information received from transmission station 102 over broad geographical area(s) including receiver station 106. Exemplary receiver station 106 is also communicatively coupled to transmission station 102 via a network 110. Network 110 can be, for example, the Internet, a local area network (LAN), a wide area network (WAN), a conventional public switched telephone network (PSTN), and/or any other suitable network system. A connection 112 (e.g., a terrestrial link via a telephone line and cable) to network 110 may also be used for supplemental communications (e.g., software updates, subscription information, programming data, information associated with interactive programming, etc.) with transmission station 102 and/or may facilitate other general data transfers between receiver station 106 one or more network resources 114a and 114b, such as, for example, file servers, web servers, and/or databases (e.g. a library of on-demand programming).

Data sources 108 receive and/or generate video, audio, and/or audiovisual programming including, for example, television programming, movies, sporting events, news, music, pay-per-view programs, advertisement(s), game(s), etc. In the illustrated example, data sources 108 receive programming from, for example, television broadcasting networks, cable networks, advertisers, and/or other content distributors. Further, example data sources 108 may include a source of program guide data that is used to display an interactive program guide (e.g., a grid guide that informs users of particular programs available on particular channels at particular times and information associated therewith) to an audience. Users can manipulate the program guide (e.g., via a remote control) to for example, select a highlighted program for viewing and/or to activate an interactive feature (e.g., a program information screen, a recording process, a future showing list, etc.) associated with an entry of the program guide. Further, example data sources 108 include a source of on-demand programming to facilitate an on-demand service.

An example head-end 116 includes a decoder 122 and compression system 123, a transport processing system (TPS) 103 and an uplink module 118. In an embodiment, decoder 122 decodes the information by for example, converting the information into data streams. In an embodiment, compression system 123 compresses the bit streams into a format for transmission, for example, MPEG-2 or MPEG-4. In some cases, AC-3 audio is not decoded, but passed directly through without first decoding. In such cases, only the video portion of the source data is decoded.

In an embodiment, multiplexer 124 multiplexes the data streams generated by compression system 123 into a transport stream so that, for example, different channels are multiplexed into one transport. Further, in some cases a header is attached to each data packet within the packetized data stream to facilitate identification of the contents of the data packet. In other cases, the data may be received already transport packetized.

TPS 103 receives the multiplexed data from multiplexer 124 and prepares the same for submission to uplink module 118. TPS 103 includes a loudness data collector 119 to collect and store audio loudness data in audio provided by data sources 108, and provide the data to a TPS monitoring system in response to requests for the data. TPS 103 also includes a loudness data control module 121 to perform loudness control (e.g., audio automatic gain control (AGC)) on audio data received from data source 108 as described in more detail below. Generally, example metadata inserter 120 associates the content with certain information such as, for example, identifying information related to media content and/or instructions and/or parameters specifically dedicated to an operation of one or more audio loudness operations. For example, in an embodiment, metadata inserter 120 replaces scale factor data in the MPEG-1, layer II audio data header and dialnorm in the AC-3 audio data header in accordance with adjustments made by loudness data control module 121.

In the illustrated example, the data packet(s) are encrypted by an encrypter 126 using any suitable technique capable of protecting the data packet(s) from unauthorized entities.

Uplink module 118 prepares the data for transmission to satellite/relay 104. In an embodiment, uplink module 118 includes a modulator 128 and a converter 130. During operation, encrypted data packet(s) are conveyed to modulator 128, which modulates a carrier wave with the encoded information. The modulated carrier wave is conveyed to converter 130, which, in the illustrated example, is an uplink frequency converter that converts the modulated, encoded bit stream to a frequency band suitable for reception by satellite/relay 104. The modulated, encoded bit stream is then routed from uplink frequency converter 130 to an uplink antenna 132 where it is conveyed to satellite/relay 104.

Satellite/relay 104 receives the modulated, encoded bit stream from the transmission station 102 and broadcasts it downward toward an area on earth including receiver station 106. Example receiver station 106 is located at a subscriber premises 134 having a reception antenna 136 installed thereon that is coupled to a low-noise-block downconverter (LNB) 138. LNB 138 amplifies and, in some embodiments, downconverts the received bitstream. In the illustrated example of FIG. 1. LNB 138 is coupled to a set-top box 140. While the example of FIG. 1 includes a set-top box, the example methods, apparatus, systems, and/or articles of manufacture described herein can be implemented on and/or in conjunction with other devices such as, for example, a personal computer having a receiver card installed therein to enable the personal computer to receive the media signals described herein, and/or any other suitable device. Additionally, the set-top box functionality can be built into an A/V receiver or a television 146.

Example set-top box 140 receives the signals originating at head-end 116 and includes a downlink module 142 to process the bitstream included in the received signals. Example downlink module 142 demodulates, decrypts, demultiplexes, decodes, and/or otherwise processes the bitstream such that the content (e.g., audiovisual content) represented by the bitstream can be presented on a display device of, for example, a media presentation system 144. Example media presentation system 144 includes a television 146, an AV receiver 148 coupled to a sound system 150, and one or more audio sources 152. As shown in FIG. 1, set-top box 140 may route signals directly to television 146 and/or via AV receiver 148. In an embodiment, AV receiver 148 is capable of controlling sound system 150, which can be used in conjunction with, or in lieu of, the audio components of television 146. In an embodiment, set-top box 140 is responsive to user inputs to, for example, to tune a particular channel of the received data stream, thereby displaying the particular channel on television 146 and/or playing an audio stream of the particular channel (e.g., a channel dedicated to a particular genre of music) using the sound system 150 and/or the audio components of television 146. In an embodiment, audio source(s) 152 include additional or alternative sources of audio information such as, for example, an MP3 player (e.g., an Apple® iPod®), a Blueray® player, a Digital Versatile Disc (DVD) player, a compact disc (CD) player, a personal computer, etc.

Further, in an embodiment, example set-top box 140 includes a recorder 154. In an embodiment, recorder 154 is capable of recording information on a storage device such as, for example, analog media (e.g., video tape), computer readable digital media (e.g., a hard disk drive, a digital versatile disc (DVD), a compact disc (CD), flash memory, etc.), and/or any other suitable storage device.

Figure 2:
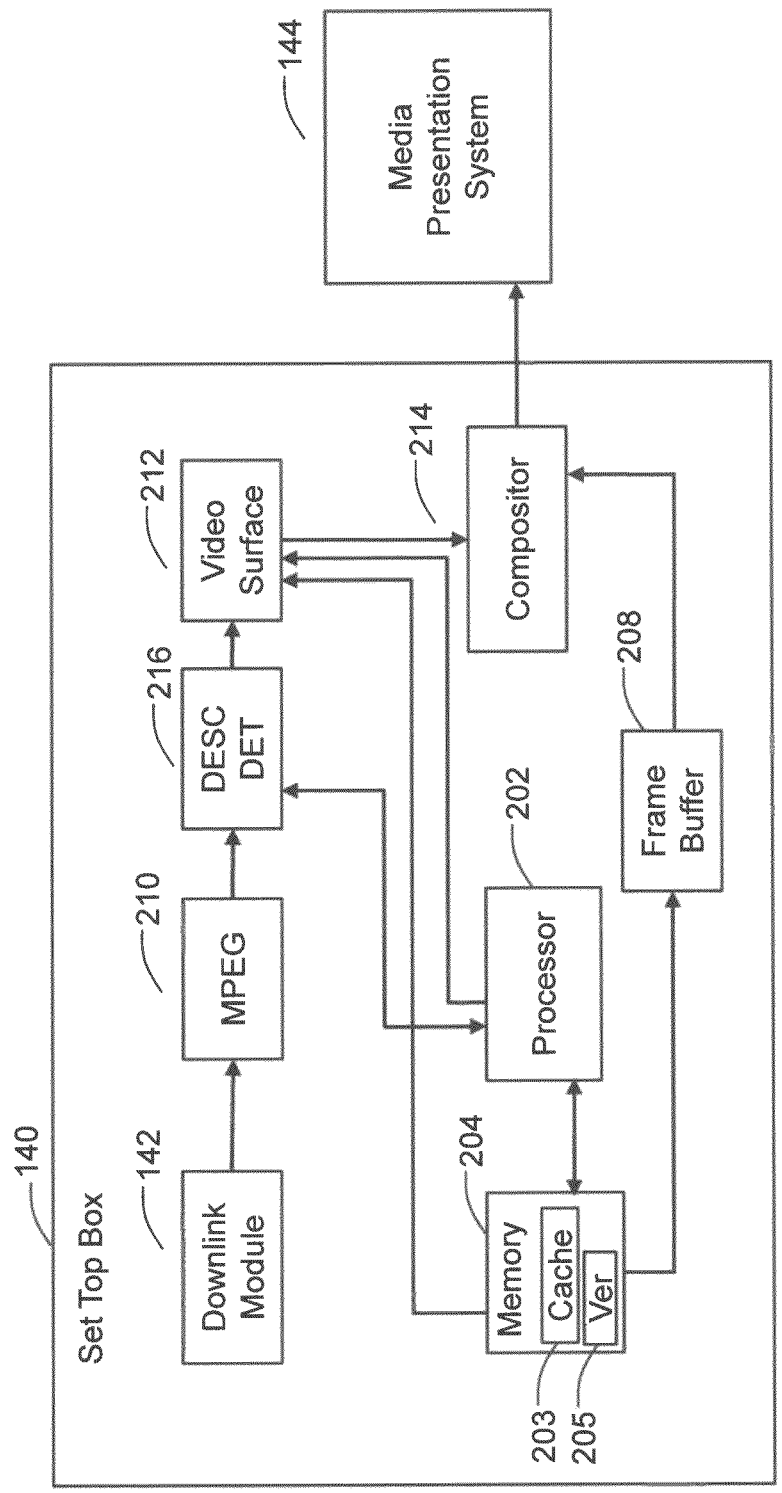
FIG. 2 is a simplified schematic diagram of an exemplary set top box according to an embodiment.

FIG. 2 is a simplified schematic diagram of an exemplary set top box (STB) 140 according to an embodiment. Such a set top box can be, for example, in the Directv HR2x family of set top boxes. As shown in FIG. 2, STB 140 includes a downlink module 142 described above. In an embodiment, downlink module 142 is coupled to an MPEG decoder 210 that decodes the received video stream so that it can be stored in a video surface 212.

A processor 202 controls operation of STB140. Processor 202 can be any processor that can be configured to perform the operations described herein for processor 202. Processor 202 has accessible to it a memory 204. Memory 204 can be used as storage space for recorder 154 (described above). Further, memory 204 can be used to store programs to be run by processor 202, for other functions necessary for the operation of STB140, as well as for the functions described herein. In alternate embodiments, one or more additional memories may be implemented in STB140 to perform one or more of the foregoing memory functions.

Frame buffer 208 stores an image or partial image to be displayed on media presentation system 144. In an embodiment, frame buffer 208 is a part of memory 204. In an embodiment, frame buffer 208 is a 1920×1080×4 bytes buffer that represents every pixel on a high definition video screen with 4 bytes of color for each pixel. In an embodiment, the four colors are red, blue, green, and alpha.

A compositor 214 receives data stored in frame buffer 208 and video surface 212. In an embodiment, compositor 214 blends the data it receives from frame buffer 208 with the data it receives from video surface 212 and forwards the blended video stream to media presentation 144 for presentation.

In an embodiment, substitute segments of media content (also referred to herein as "content") are downloaded to STB 140. For example, such content can include video and/or audio content. Each substitute segment of media content corresponds to a rating version different from a current rating version. For example, such rating version can be any rating classification provided by under any rating system, for example, TV-G, TV-14, G, etc. Such rating versions can also including any subdivisions of ratings classifications, for example, D, L, S, and V. When substituted for corresponding content segments having a default rating, as described below, the rating version of the content is changed to that of the substitute media content segments.

In an embodiment, sets of media content segments can be downloaded. Each set corresponds to a particular rating version, and includes all substitute video and/or audio substitute content segments necessary to change the rating of content being delivered from a current rating version to another rating version. In an embodiment, the downloaded media content segments are stored in memory 204, for example, in substitution cache 203

In an embodiment, in addition to downloading media content segments, substitution instructions are also downloaded to set top box 140 and stored in memory 204. In an embodiment, the substitution instructions correspond to substitution descriptors placed in a content stream. When a substitution descriptor is detected, in an embodiment, processor 202 will identify and execute the substitution instructions that correspond to the detected substitution descriptor to substitute one or more media content segments (or skip one or more media content segments) in a content stream being delivered to a user. In an embodiment, four substitution instructions are stored for a particular rating version: (1) skip portion of video, and possibly audio, content, (2) mute a portion of media content, for example mute a portion of audio content, (3) substitute a portion of media content, for example, substitute a portion of audio content, and (4) substitute a portion of one or more types of media content, for example, substitute a portion of video, and possibly audio, content. Additional or different instructions may be used in a particular embodiment.

In an embodiment, a descriptor detector 216 detects a substitution descriptor in a content stream being delivered to a user. For example, in an embodiment, descriptor detector 216 checks the content stream output by MPEG decoder 210 to detect the presence of a substitution descriptor. If descriptor detector 216 detects such a substitution descriptor, the substitution descriptor is stripped from the content stream being delivered to the user and forwarded to processor 202 for processing.

In an embodiment, processor 202 evaluates the substitution descriptor to identify the substitution instruction(s) corresponding to the substitution descriptor, and substitution segment(s) to be substituted in the content being delivered to the user. For example, the substitution descriptor may store one or more substitution instruction identification codes that identify one or more corresponding substitution instructions stored in substitution cache 203, and one or more substitution segment identification codes that identify one or more corresponding substitution segments stored in substitution cache 203. Using the substitution instruction identification code(s) and the substitution segment identification code(s), processor 202 locates the corresponding substitution instruction(s) in memory 204 and executes them. As described above, in an embodiment, the substitution instruction may (1) skip a portion of the media content, for example, skip a portion of the video, and possibly audio, content, (2) mute a portion of the media content, for example, mute a portion of the audio content, (3) substitute a portion of the media content, for example, substitute a portion of the audio content, and (4) substitute a portion of one or more types of media content, for example, substitute a portion of the video, and possibly audio, content. As a result execution the substitution instruction(s) provides a different rated portion of the media content, thereby effectively changing the rating version from the current rating version.

In an embodiment, the substitution descriptor can have multiple instruction identifications and corresponding substitution segment identifications. In such a case, each instruction identification and corresponding substitution segment identification corresponds to a rating version that is different from the default rating version in the content stream being delivered to the user.

In an embodiment, skipping content being delivered is equivalent to deleting the content. This is because in the embodiment, the substitution instruction(s) will cause video to be displayed at a new location, for example, 20 seconds, in the future. In such an embodiment, the skipping content causes a lowering of the rating because content not appropriate for a particular audience is skipped or deleted.

In another manner, substitution instruction(s) result a rating change by causing processor 202 to substitute one type of media content, for example, substituting audio corresponding to a particular portion of the video. This may be appropriate where substitution of different audio may change the rating to one appropriate for a different audience.

In another manner, substitution instruction(s) result in a rating change by causing processor 202 to substitute media content, for example, to substitute video and, in some cases, audio, content. This may be appropriate where substitution of different video, along with audio, if appropriate, may change the rating to one appropriate for a different audience.

In an embodiment, the media content substitution segments are stored in memory 204 in a substitution cache 203. In an embodiment, substitution cache 203 is located at the beginning of the content to be displayed to a user. Any technique for storing the media content substitution segments in substitution cache 203 can be employed. For example, in the case of downloaded video, such as video on demand, the substitution segments can be sent to set top box 202 for storage in substitution cache 203. In addition so that video playback will begin at the right point, control information is also sent to start the playback of the video after the storage location of the stored substitution segments in substitution cache 203.

In an embodiment, for live media content, the media content segments are downloaded prior to a user experiencing the content. For example, for live, or real time video, in one embodiment, substitution segments are downloaded prior to the content the user will see. In another embodiment, set top box 140 is configured to play foreground video, for example, a preview of the user-selected content, while the substitution segments are downloaded to substitution cache 203 in the background. In an alternate embodiment, a black screen is displayed to the user while the substitution segments are downloaded to set top box 202. The latter technique is better suited for short transfer times, that is, cases where the number and/or size of the substitution segments are small.

In an embodiment, subsequent to downloading substitution instructions and substitution segments, processor 202 creates a substitution cache table containing the location of each instruction and each substitution segment. The table provides processor 202 the locations for instructions sets and substitution segments to respond to substitution descriptors as described below.

Figure 3:
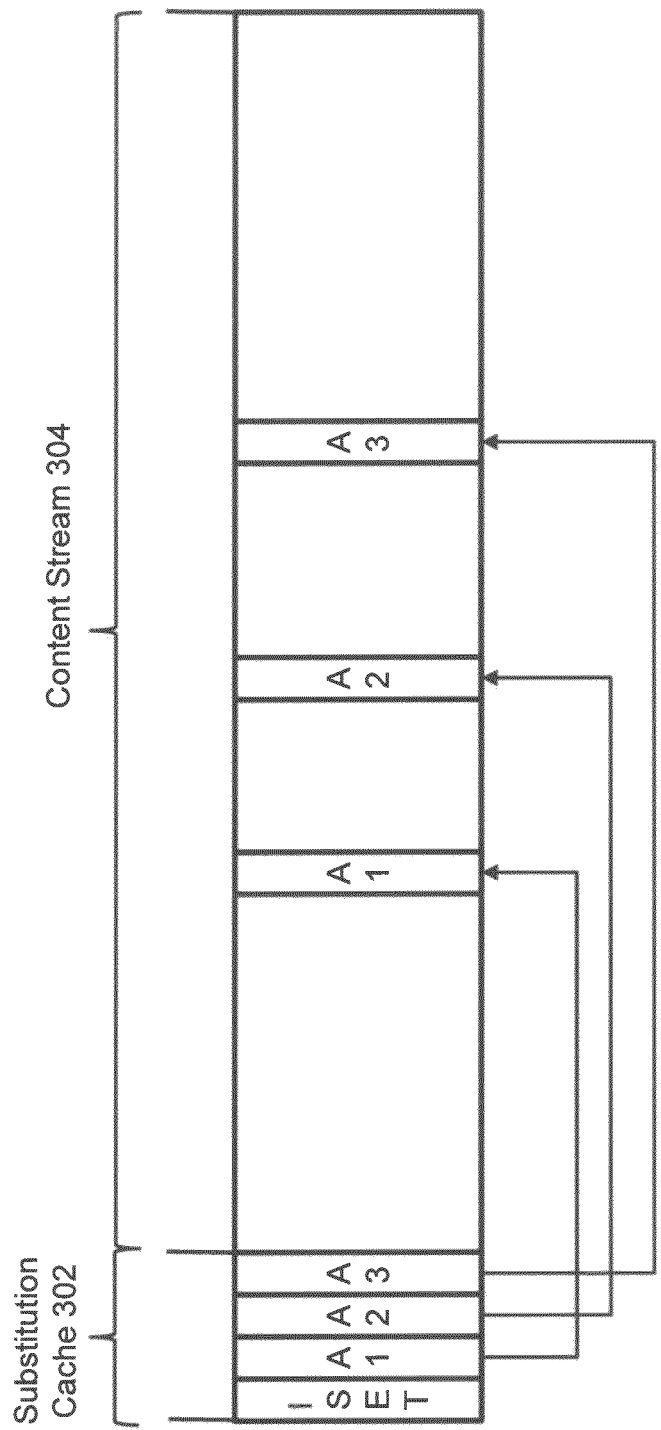
FIG. 3 is a diagram illustrating an exemplary substitution of content segments according to an embodiment.

FIG. 3 is a diagram illustrating an exemplary substitution of media content segments according to an embodiment. Substitution segments A1, A2, A3 are downloaded to a substitution cache 302 in set top box 140. In the exemplary illustration of FIG. 3, substitution segments A1, A2, and A3 form a set of substitution segments corresponding to a rating version that is different from a default rating version. For example, the default rating version may be TV-MA and substitution segments A1, A2, and A3 may, by substitution, change the rating to TV-PG. In an embodiment, substitution cache 302 is a portion of memory 204. In another embodiment, substitution cache 302 is a separate memory. The substitution segments can be downloaded to substitution cache 302 as described above.

In operation, a user can select to experience media content, for example, viewing a program according to a default rating version or according to the rating version provided by substitution segments A1, A2, and A3. In an embodiment, such selection can be made using a system settings tool that provides the user with option for choosing or entering a desired rating version. In an embodiment, the user's selection is stored in a memory location 205 in memory 204. Initially, a default rating version is stored in memory location 205 is a default user selection. In an embodiment, the default is a value that causes detected substitution descriptors to be ignored.

Assume that rather than use the default rating version, the user selects to experience media content, such as, for example viewing the content, at the rating version corresponding to substitution segments A1. A2, and A3. The user's rating version selection is stored in memory location 205. When processor 202 receives a substitution descriptor from description detector 216, processor 202 evaluates the received substitution descriptor and looks up the user rating version selection stored in memory location 205. Processor 202 retrieves for execution, the instruction(s) identified in the received substitution descriptor in accordance with the user rating version selection stored in memory location 205, and any associated substitution segment identifications. Processor 202 then executes the retrieved instruction and to cause a rating version change in the content being delivered to the user. As described above, in an embodiment, the instruction(s) control how to modify the content stream, when to modify it, and, in some cases, for how long. For example, as described above, in an embodiment, these modifications can include (1) skipping a portion of the media content, for example, skipping a portion of the video, and possibly audio, content, (2) muting a portion of the media content, for example, muting a portion of the audio content, (3) substituting a portion of the media content, for example, substituting a portion of the audio content, and (4) substituting a portion of one or more types of media content, for example, substituting the video, and possibly audio, content. If media content, such as, for example, audio content or video content, needs to be substituted, execution of the substitution instruction(s) will cause substitution segment A1, A2, or A3 to be substituted in the content stream at the appropriate time.

In an embodiment, to provide set top box 140 time to evaluate substitution descriptors and execute associated instructions, substitution descriptors are placed in the content stream prior to where the actual substitution is to take place. For example, in an embodiment, the substitution descriptor is placed in the content stream approximately 30 seconds prior to the time the content to be substituted would otherwise be displayed to a user. This additional time allows the set top box to perform any preliminary operations required to substitute required substitution segments in the content stream. In this manner, the substitution descriptor synchronizes set top box 140 with a substitution event that is to occur in the future.

In an embodiment, the user can dynamically select different rating versions. For example, in a manner similar to the user selecting to view the content with the rating version corresponding to segments A1, A2, and A3 above, the user can, during the content delivery, choose to view the content at the default setting. After such selection, substitution descriptors in the content stream will be ignored.

Figure 4:
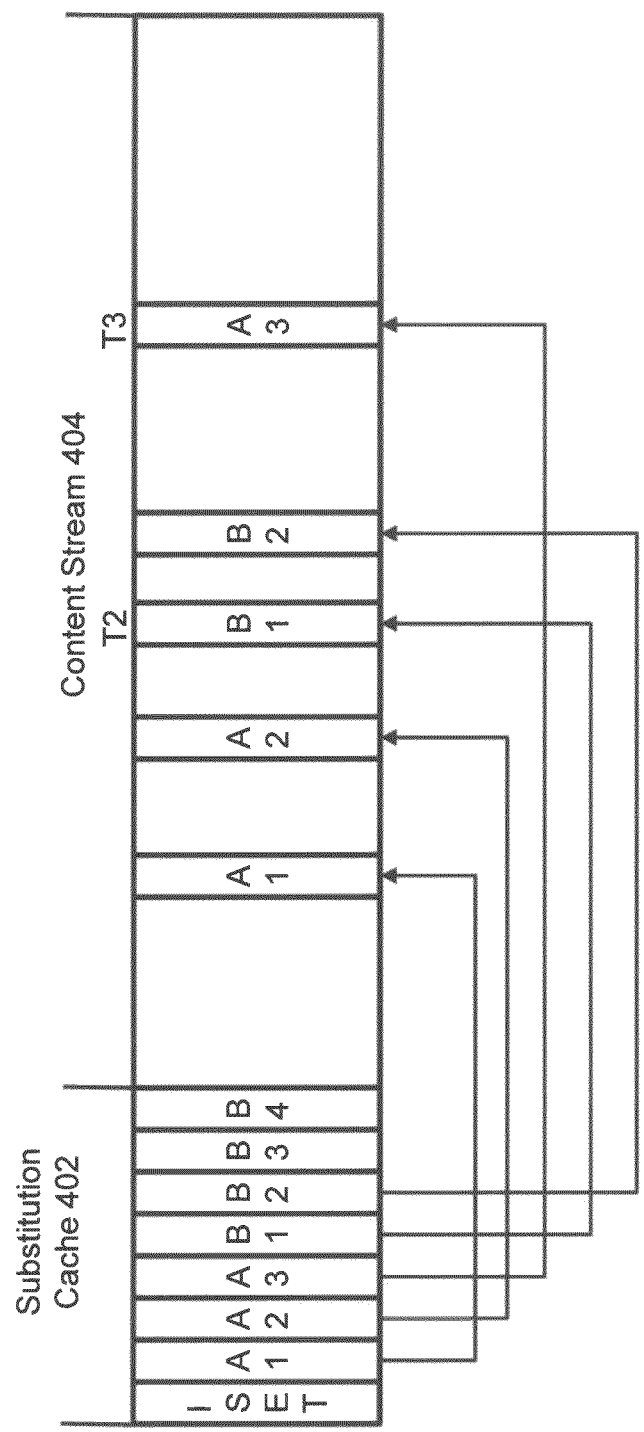
FIG. 4 is a diagram illustrating an exemplary dynamic substitution of content segments according to an embodiment.

FIG. 4 is a diagram illustrating an exemplary dynamic substitution of content segments according to an embodiment. Substitution segments A1, A2, A3, B1, B2, B3, and B4 are downloaded to a substitution cache 302. In an embodiment, substitution cache 402 is a portion of memory 204. The substitution segments can be downloaded to substitution cache 402 as described above. In the exemplary illustration of FIG. 4, substitution segments A1, A2, and A3 form a set of substitution segments corresponding to a first rating version, for example, PG, and substitution segments B1, B2, B3, and B4 form a set of substitution segments corresponding to a second rating version, for example G.

By caching instructions for all potential rating versions that are available for a user to select, there is no need to send additional instructions during a content stream when the user selects a particular rating version for the content.

In the embodiment of FIG. 4, a user can select which rating version to experience for particular selected content, that is the default rating version (no substituted content), the rating version associated with substitution segments A1, A2, and A3, or the rating version associated with substitutions segments B1, B2, B3, and B4. If for example the default rating version of the selected content was TV-MA, and the user desired a PG-rated version, the user would select PG-rating. Such selection can be made, for example, by the user selecting a settings setup screen to select a particular rating version. In an embodiment, the user's rating version selection is stored in a memory location 205 in memory 204.

In an embodiment, a user can dynamically select which rating version to experience. For example, as shown in FIG. 4, the user initially chose to experience the content with rating version A, for example. PG-rated. Prior to time T2, the user decided to select to experience subsequent content with rating version B, for example, G-rated. The user can make the dynamic selection by accessing the set up screen corresponding to the rating version selection, and selecting the desired rating version. The new rating version selected by the user replaces the rating version stored in memory location 205 in that stored the user-selected rating version. When processor 202 receives and processes subsequent substitution descriptors, it will do so in accordance with the user-desired rating version as stored in memory location 205. Thus, as shown in FIG. 4, the user chose to experience the content with rating version B, and did experience two substitution segments, B1 and B2. Thereafter, prior to time T3 the user decided to switch back to experiencing the content with rating version A as shown by the presence of substitution segment A3 in the content stream.

In an embodiment, a user can choose to preview one or more of the substitution segments. Preview in this sense covers audio, visual, and any other way a user may experience the content. In an embodiment, in a preview mode, substitution segments A1, A2, and A3 are provided to the user, as are substitution segments B1, B2, B3, and B4. In an embodiment, in the preview mode, the default content segments are also provided to the user. In this manner, the user can determine whether to change the rating version, and which rating version to change to if desired.

In an embodiment, to accomplish the preview feature, processor 202 executes instructions to provide one or more of the substitution segments to the user as a preview. For example, if the user desired to preview substitution segments for rating versions A and B in FIG. 4, processor 202 would execute the appropriate instructions in substitution cache 402 to allow the user to preview substitution segments for rating versions A and B.

It should be noted that embodiments are not limited to using media content substitution segments from just one set of substitution segments. Thus, In an embodiment, substitution segment sets can be combined. For example, in FIG. 4, it may be the case that for a G rating, segments from both substitution sets A and B are required, whereas for PG rating, only substitution segments from substitution segment set A are required. Further, a particular rating version may require individual substitution segment from multiple substitution segment sets. For example, in FIG. 4, if a user that did not wish to view violence, but would accept, language and sexual content, the user need to be provided substitution segment A2 (which, in this example, excludes violence) from substation segment set A and substitution segment B3 (which, in this example, includes language and sexual content) from substation segment set B.

In the embodiments discussed above, instructions were identified by identification codes in the substitution descriptors. In another embodiment, substitution instructions are keyed to time in the media content stream. Thus, for example, processor 202 is configured to execute one or more substitution instructions at a particular time in the content stream. Execution of the instruction will cause the operation defined in the instruction to occur. As described above, in an embodiment, these operations include (1) skipping a portion of the media content, such as, for example, skipping a portion of the video, and possibly audio, content, (2) muting a portion of the media content, such as, for example, muting a portion of the audio content, (3) substituting a portion of the media content, such as for example, substituting a portion of the audio content, and (4) substituting a portion one or more types of media content, such as, for example, substituting a portion of the video, and possibly audio, content.

Figure 5:
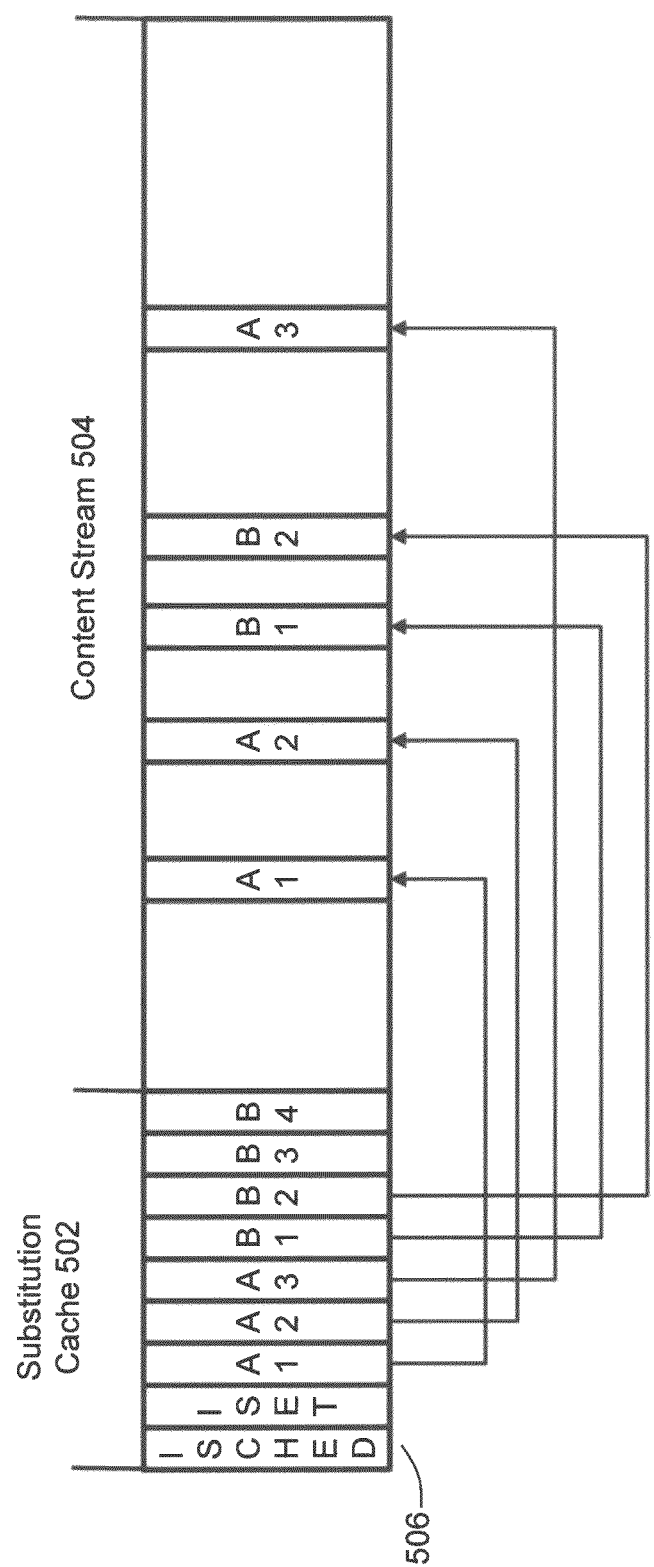
FIG. 5 is a diagram illustrating an exemplary substitution of content segments using a substitution instruction schedule according to an embodiment.

FIG. 5 is a diagram illustrating substitution of content segments using a substitution instruction schedule 506 according to an embodiment. The substitution segments can be downloaded to substitution cache 502 as described above. In an embodiment, a substitution instruction schedule 506 identifies when a particular instruction should be executed to modify the content stream to cause a change in rating version. As described below, the operation of the embodiment illustrated in FIG. 5 is similar to that described in FIG. 4 except that rather than detect substitution descriptors in the media content stream, processor 202 monitors elapsed time and determines if substitution instruction schedule 506 includes a substitution instruction at a particular elapsed time. If there is such a substitution instruction, processor 202 executes it to cause the appropriate substitution. The user rating version selection can be dynamic in FIG. 5 as described above.

Figure 6:
FIG. 6 illustrates an exemplary substitution instruction schedule according to an embodiment

FIG. 6 illustrates an exemplary substitution instruction schedule 506 according to an embodiment. As shown in FIG. 6, a substitution instruction schedule 602 includes times in a content stream at which to perform an instruction to effectuate a rating version chosen by a user, identification of the instruction to perform at that time, and identification of any applicable substitution segment(s). In an embodiment, times are measured from the beginning of the content stream. For example, as shown in substitution instruction schedule 602, at 15 minutes, 30 seconds after the beginning of the content stream, processor 202 executes an instruction(s) to substitute video and audio content using the substitution segment identified as "Seg 1"; at one hour, 20 minutes after the beginning of the content stream, processor 202 executes an instruction(s) to substitute audio content using the substitution segment identified as "Seg 4"; and at one hour, 30 minutes after the beginning of the content stream, processor 202 executes an instruction(s) to mute media content, such as, for example, to mute audio content and no substitution segment is required. Execution of these instructions at the scheduled times results in a rating version change to that desired by the user as stored in memory location 205.

In operation of the embodiment illustrated in FIGS. 5 and 6, processor 202 monitors elapsed time in the content delivered to the user. When the elapsed time coincides with a time in the substitution schedule to perform an action to effectuate a rating version selected by the user, processor 202 accesses the substitution table to obtain an identification of the instruction to execute to effectuate the rating version selected by the user and any applicable substitution segment(s). Processor 202 then uses the identification to locate the appropriate instruction in the substitution cache according to the user rating version selected as stored in memory location 205 for execution. Execution of the instruction(s) using identified substitution segment(s), if applicable, effectuates the rating version selected by the user. In an embodiment, if the value stored in memory location 205 is the default value, processor 202 is configured not to monitor elapsed time or check the substitution schedule.

Figure 7:
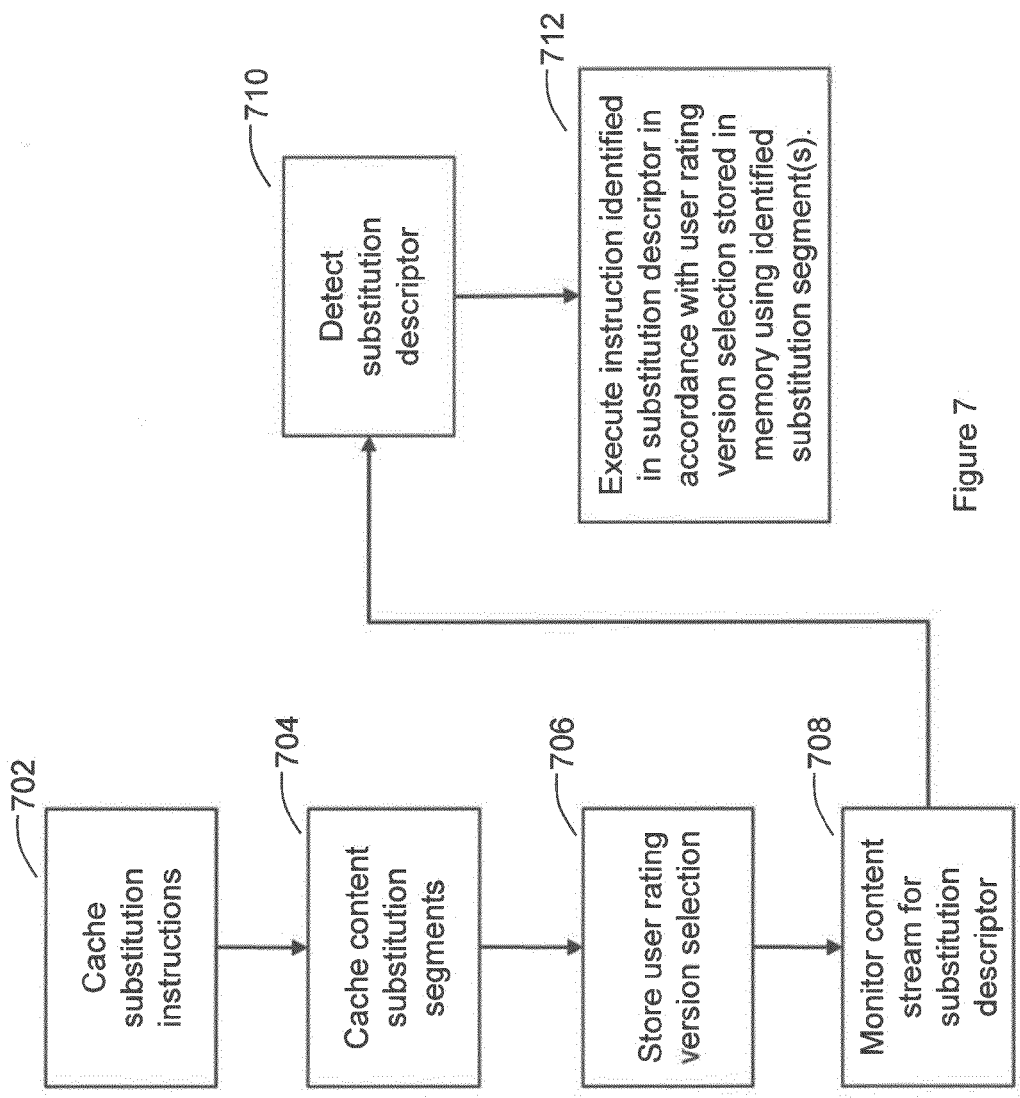
FIG. 7 is a flow chart for a method of providing multiple rating versions according to an embodiment.

FIG. 7 is a flow chart for a method of providing multiple rating versions according to an embodiment. In step 702 one or more substitution instructions are cached in a memory, such as in substitution cache 203. As described above, in an embodiment, the instructions are sent to a set top box, such as set top box 140, prior to the content stream containing the content the user desires to view. In step 704 one or more content substitution segments or sets of content substitution segments are cached in a memory, such as in substitution cache 203. In an embodiment, each set of content substitution segments corresponds to a unique rating version that can be selected by a user.

In step 706 a user rating version is stored in a memory location, for example, memory location 205. In an embodiment, a default rating version is stored in the memory location until a user changes it, for example, by accessing a setup screen, as described above.

In step 708, the content stream is monitored for any substitution descriptors. In step 710, a substitution descriptor is detected and sent to a processor, such as processor 202. In step 712, the instruction identified in the detected substitution descriptor is executed in accordance with the rating version selection stored for the user using any identified substitution segments. In an embodiment, when the default value is stored in memory location 205, processor 202 ignores detected substitution descriptors.

Figure 8:
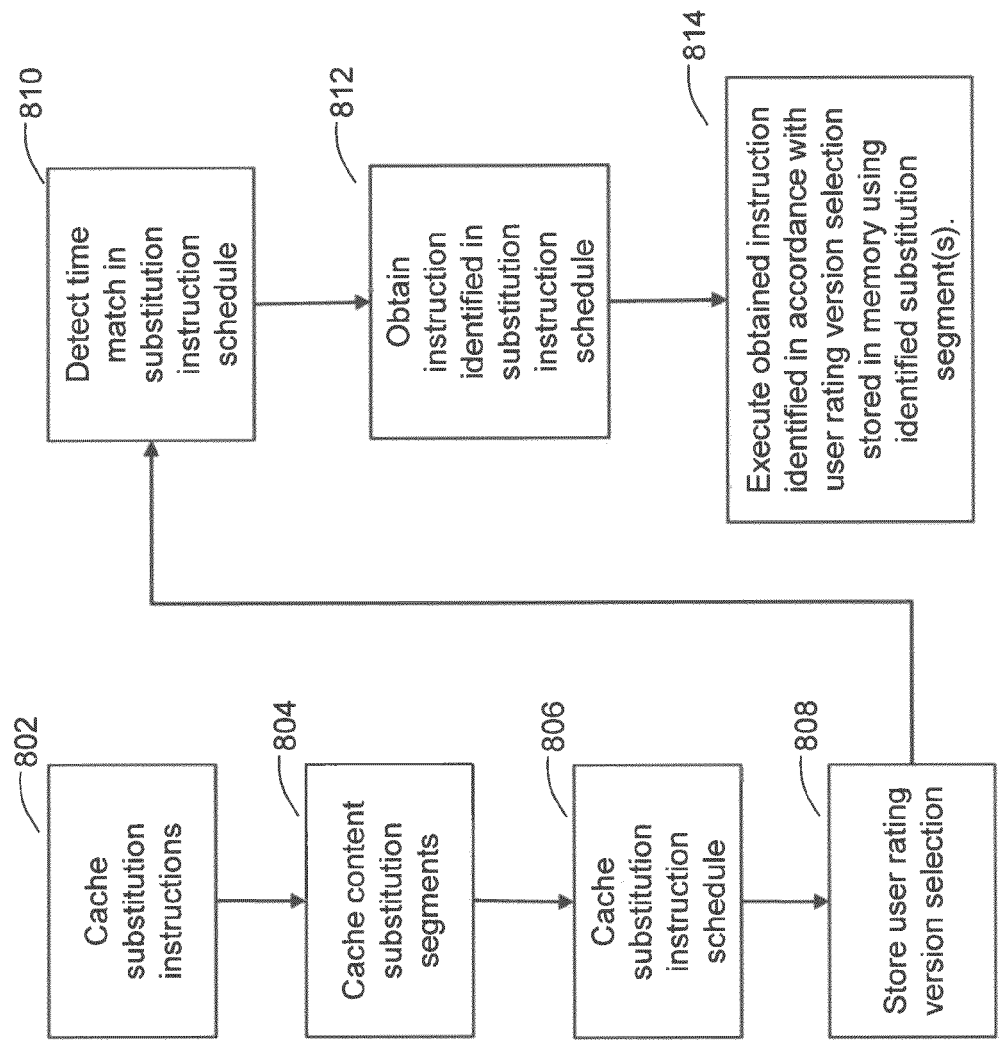
FIG. 8 is a flow chart for a method of providing multiple rating versions according to an embodiment.

FIG. 8 is a flow chart for a method of providing multiple rating versions according to an embodiment. In step 802 one or more substitution instructions are cached in a memory, such as in substitution cache 203. As described above, in an embodiment, the instructions are sent to a set top box, such as set top box 140, prior to the content stream containing the content the user desires to view. In step 804 one or more content substitution segments or sets of content substitution segments are cached in the memory, such as in substitution cache 203. In an embodiment, each set of content substitution segments corresponds to a unique rating version that can be selected by a user. In step 806 a substitution instruction schedule is cached in the memory, such as in substitution cache 203. As described above, the substitution instruction schedule has entries with times when a modification to the content stream is required and a corresponding identification of an instruction(s) to execute to effectuate the required modification at the specified time.

In step 808 a user rating version is stored in a memory location, for example, memory location 205. In an embodiment, a default rating version is stored in the memory location until a user changes it, for example, by accessing a setup screen, as described above. In an embodiment, if the value in memory location 205 corresponds to the default rating version, processor 202 is configured not to monitor elapsed time.

In step 810, the elapsed time of the content stream from its beginning is monitored to detect a matching time to an entry in the substitution instruction schedule. When a match is detected, in step 812, the instruction identified in the instruction schedule is obtained. In step 814, the instruction obtained instruction is executed in accordance with the rating version selection stored for the user.

Substitution triggering mechanisms other than in-content substitution descriptors and time can be used. For example, tones, pulses, and any other triggering mechanism that indicates that a substitution is to be performed can be used. Upon detecting such tones, pulses, or other signals, processor 202 can take appropriate action to perform the required substitution. For example, if a tone is detected, processor 202 can undertake to perform the next substitution stored in a substitution table. In another embodiment, a series of tones, pulses or other signals can code a substitution descriptor, which processor 202 can then process as described above.

It should be noted that although the foregoing description has been with respect to set top boxes and satellite systems, embodiments are not so limited. Rather, embodiments can be applied to any media content delivery system in which a receiving device has a memory for storing substitution segments for the delivered media content. For example, personal computers and smart devices, such as tablets, telephones, and other smart devices, can use the techniques described above to provide multiple rating version services to users over satellite and/or terrestrial communication paths.

In an embodiment, the ratings version is automatically set at a system level. For example, if a set top box, or other device on which an embodiment of the present invention is implemented, blocks R-rated content, the system be configured to automatically select rating levels in accordance with the system level blocking to thereby select a next-lowest rating level automatically. In an embodiment, for example, the next lower rating version could be stored in memory location 205 as a "user"-selected rating version.

Embodiments of the present invention can be configured to handle a situation when the user tunes or turns to media content after the start of the media content, for example, after the start of a television program. In such a case, there are several embodiments for downloading any required substitution segments to comply with the user's rating version desires.

In a first embodiment, any required substitution segments are downloaded in parallel with the media content. For example, such substitution segments can be downloaded to a substitution cache via a separate data stream or using a separate tuner, if available, in a particular device. In some cases, this may require the data to be downloaded at a lower data rate. In an second embodiment, any required substitution segments are downloaded from the Internet or other substitution segment storage on a "just-in-time" or "as needed" basis.

In another embodiment, substitution segments for rating versions for a number of programs can be prestored in a substitution cache. These substitution segments can be downloaded to the substitution cache separate from the actual media content itself. When a user then desires to experience a particular media content, the system will first determine whether substitution segments are available for the media content. If so, the system will query the user as to whether the user desires a different rating version. If so, the user will query the user as to the user's desired rating version and store the desired ratings version in memory, for example, in memory location 205. In an embodiment, a lookup table provides correspondence between substitution segments for each particular media content for which substitution segments are stored. Substitution segment processing can then proceed as described above.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and, or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system to allow a user to select one of a plurality of rating versions in which to experience content transmitted in a content stream, comprising:
   a memory, the memory having a substitution cache to store one or more substitution segments and one or more substitution instructions in an instruction set that are downloaded to the memory at the beginning of the content stream;
   a table stored in the memory, the table containing a location of the instruction set and a location of each stored substitution segment;
   a substitution descriptor detector to detect a substitution descriptor in the content being delivered to the user; and
   a processor to process the substitution descriptor to obtain an identification for at least one substitution instruction from the substitution descriptor, wherein the processor obtains and executes at least one substitution instruction from the substitution cache corresponding to the obtained identification to cause a rating version change in the content being delivered to the user in accordance with the locations of the instruction set and at least one substitution segment required for executing the at least one substitution instruction in the table, the processor further configured to cause the system to display predetermined video to the user while the substitution segments and substitution instructions are downloaded to the memory at the beginning of the content stream,
   wherein the system is configured to allow the user to modify a desired user rating version dynamically.

2. The system recited in claim 1, wherein the substitution descriptor stores a substitution instruction identification code that identifies a substitution instruction to execute.

3. The system recited in claim 1, wherein the substitution descriptor stores a substitution segment identification code that identifies a substitution segment stored in the substitution cache.

4. The system recited in claim 1, wherein the substitution descriptor is placed in the content stream sufficiently ahead to allow the system to synchronize content substitution.

5. The system recited in claim 1, wherein the memory further comprises a storage location to store the user rating version selection.

6. The system recited in claim 1, wherein the content comprises video content and audio content, and wherein execution of a substitution instruction causes one of (1) skipping a portion of the video content, (2) muting a portion of the audio content, (3) substituting a portion of the audio content, and (4) substituting a portion of the video content.

7. The system recited in claim 1, wherein at least one of the substitution segments stored in the substitution cache is made available for preview by the user.

8. A system to allow a user to select one of a plurality of rating versions in which to experience content transmitted in a content stream, comprising:
   a memory, the memory having a substitution cache to store one or more substitution segments and one or more substitution instructions that are downloaded to the memory at the beginning of the content stream;
   a substitution instruction schedule that stores a time for a substitution instruction to executed, a substitution identification code corresponding to a substitution instruction to be executed at the time; and
   a processor configured to monitor elapsed viewing time, to determine if the elapsed viewing time coincides with a time in an entry in the substitution instruction schedule, and when there is such time elapsed viewing time coincidence, to obtain and execute at least one substitution instruction from the substitution cache corresponding to the instruction in the substitution instruction schedule corresponding to the elapsed viewing time to cause a rating version change in the content being delivered to the user, the processor further configured to cause the system to display predetermined video to the user while the substitution segments and substitution instructions are downloaded to the memory at the beginning of the content stream,
wherein the system is configured to allow the user to modify a desired user rating version dynamically.

9. The system recited in claim 8, wherein the wherein at least a portion of the content stream is stored in the memory at a storage location immediately following a last storage location of the memory cache, and wherein the processor causes playback of the content stream to begin at the storage location that immediately following the last storage location of the memory cache.

10. The system recited in claim 8, wherein the memory further comprises a storage location to store the user rating version selection.

11. The system recited in claim 8, wherein the content comprises video content and audio content, and wherein execution of a substitution instruction causes one of (1) skipping a portion of the video content, (2) muting a portion of the audio content, (3) substituting a portion of the audio content, and (4) substituting a portion of the video content.

12. The system recited in claim 8, wherein at least one of the substitution segments stored in the substitution cache is made available for preview by the user.

13. A method for allowing a user to select one of a plurality of rating versions in which to experience content transmitted in a content stream, comprising:
receiving at least one substitution instruction and storing the received at least one substitution instruction as an instruction set in a memory cache that is downloaded to the memory at the beginning of the content stream;
receiving at least one substitution segment and storing the received at least one substitution segment in a memory cache that is downloaded to the memory at the beginning of the content stream;
displaying predetermined video to the user while the substitution segments and substitution instructions are downloaded to the memory at the beginning of the content stream;
generating a table after storing the instruction set and at least one substitution segment in the memory that contains a location of the instruction set and a location of each stored substitution segment in the memory;
storing a rating version selected by a user in a memory location;
executing at least one substitution instruction to change the content being delivered to the user in accordance with the rating version stored in the memory location in accordance with the locations of the instruction set and at least one substitution segment required for execution of the at least one substitution instruction in the table, and
dynamically modifying the rating version of the content being delivered to the user.

14. The method of claim 13, further comprising detecting a substitution descriptor in the content to be provided to the user.

15. The method recited in claim 14, further comprising obtaining at least one substitution instruction identification code corresponding to the at least one instruction to be executed, and obtaining the at least one substitution instruction to be executed from the substitution cache using the at least one substitution instruction identification code.

16. The method recited in claim 13, further comprising:
monitoring an elapsed time since a start of the content to be delivered to the user;
determining if the elapsed time coincides with an elapsed time in a substitution instruction schedule; and
obtaining a substitution identification code of at least one instruction in the substitution instruction schedule corresponding to the elapsed time;
obtaining the at least one instruction from the substitution cache based on the at least substitution identification code; and
executing the obtained at least one instruction to cause a change in the rating version of the content being delivered to the user in accordance with the rating version selected by the user stored in the memory location.

17. The method recited in claim 13, further comprising previewing at least one substitution segment to the user.

* * * * *